Figure 1:
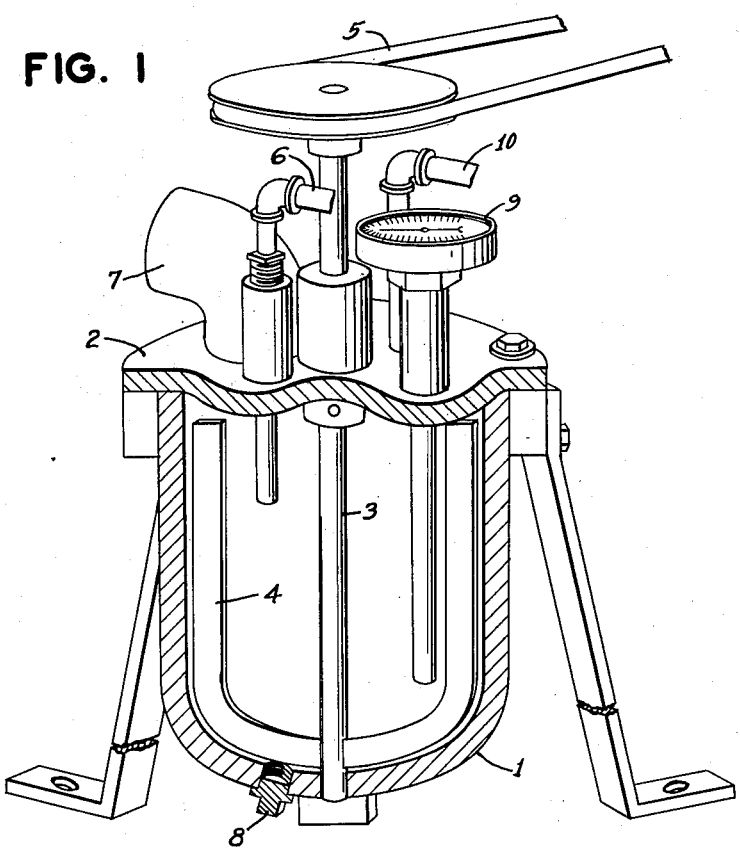

Jan. 20, 1953 K. H. WARREN 2,626,237
SEPARATION OF VOLATILE FROM NONVOLATILE CONSTITUENTS
OF AN AQUEOUS MOLASSES FERMENTATION RESIDUE
Filed Oct. 28, 1949

INVENTOR
*Kenneth H. Warren*
BY
*Pennie, Edmonds, Morton and Barrows*
ATTORNEYS

Patented Jan. 20, 1953

2,626,237

UNITED STATES PATENT OFFICE 2,626,237

SEPARATION OF VOLATILE FROM NON-VOLATILE CONSTITUENTS OF AN AQUEOUS MOLASSES FERMENTATION RESIDUE

Kenneth H. Warren, Glen Burnie, Md., assignor, by mesne assignments, to National Distillers Products Corporation, New York, N. Y., a corporation of Virginia Application October 28, 1949, Serial No. 124,070

7 Claims. (Cl. 202—63)

This invention relates to a method for the separation of the volatile from the non-volatile constituents of fermentation residues.

Residues produced by the fermentation of relatively impure sugar solutions such as molasses may contain valuable constituents such as lactic acid, butyric acid, glycerol, 2,3-butylene glycol and similar materials, which are considerably more difficult to volatilize than the lower alcohols which may also result from the fermentation. For example, after blackstrap molasses has been fermented to produce glycerol and the readily volatile products such as ethyl alcohol are removed, there is left an aqueous residue containing in solution glycerol and the inorganic salts originally contained in the molasses. There may be present also varying amounts of organic matter, portions of which may be insoluble. In the case of fermentations to produce ethyl alcohol, for example, the residue will contain only minor amounts of valuable volatile constituents, but the inorganic salts and organic matter present are a source of useful potash, nitrogen and phosphorous for the fertilizer industry.

Many attempts have been made to recover both the volatile and non-volatile constituents of fermentation residues in such conditions that each material will have its maximum economic value. Thus, the inorganic constituents have been recovered by combustion processes whereby the salts are obtained in the resulting ash, but such methods result in a loss of the organic matter with its accompanying nitrogen content. Both the nitrogen and the organic matter have considerable value as fertilizer ingredients.

The presence of large amounts of viscous, tarry residues in molasses fermentation residues makes recovery of the volatile constituents by distillation processes extremely difficult; and extraction processes remove large amounts of these impurities along with the desired constituents, making subsequent purification difficult and costly.

It is an object of the present invention to provide a method whereby the non-volatile ingredients of a fermentation residue may be separated from the volatile constituents, whether the latter are merely water or materials of commercial value, such as lactic acid, butyric acid, glycerol, 2,3-butylene glycol or the like.

It is also an object of the present invention to provide an improved method for the separation and recovery of volatile organic compounds from a concentrated fermentation residue.

It is a further object of this invention to provide a process for the recovery of the non-volatile constituents of a fermentation residue in the form of discrete, nodular, free-flowing solid particles which are non-hygroscopic.

It is another object of this invention to provide a process whereby the non-volatile constituents of a fermentation residue having fertilizer value may be obtained in the form of free-flowing, non-hygroscopic, hard, nodular particles.

The foregoing and other objects are accomplished in accordance with the method of the present invention by continuously feeding an aqueous fermentation residue to an agitated body of heated, discrete, solid particles maintained at a temperature adapted to effect vaporization of the volatile constituents of the residue, the feeding being effected at a rate such that the granular character of the body of discrete solid particles is not substantially altered, and continuously removing the discrete, nodular, free-flowing, non-hygroscopic solid particles at substantially the rate at which they are formed.

The granular character of the body of discrete solid particles is maintained in substantially unaltered condition when the liquid fermentation residue is fed thereto at a rate such that the surface of the body of solids is not allowed to form a slurry with the liquid feed. The rate of feed is dependent upon such variables as the amount of discrete solid particles present, the distribution of the fluid fermentation residue thereon, the temperature of the body of solids, the amount of volatile constituents in the liquid fermentation residue and the like. The examples given below set forth suitable conditions for operation with different types of equipment.

A wholly unexpected result of the operation of the process of the invention lies in the continuous production of new discrete, solid, free-flowing, non-hygroscopic, nodular particles of substantially the same size of those used to fill the drying apparatus at the start. It would normally have been expected that the initial particles would have grown in size but remain essentially constant in number. This fact, in conjunction with the small size of the formed particles, makes the process particularly valuable for the production of material for the fertilizer industry.

The volatile constituents of the liquid fermentation residue may be readily recovered by condensing the vapors evolved from the body of solid particles. The apparatus in which the process is carried out may, for example, be equipped with a vapor line or pipe leading to a condenser for separating the condensible material, such as lactic acid, glycerine or water, from any non-condensible gases which may be present. A partial condensation may be effected whereby the bulk of the water may be removed as steam while the higher boiling condensible material is condensed to liquid form and separated thereby. Cyclones and similar solid-separating devices may be employed in conjunction with condensers for separating any solid material which may be carried over in the vapor stream and such solids may be returned to the dryer, if desired.

Steam, super-heated or not, and other vapors or gases may be used to facilitate the removal of volatile from non-volatile constituents.

For a more complete understanding of the method of the present invention, reference is made to Fig. 1 of the accompanying drawings which illustrates one form of apparatus in which the method may be carried out. In Fig. 1, the numeral 1 signifies an iron pot having a capacity of about three liters and having a top or cover 2. The apparatus also comprises a shaft 3 to one end of which is firmly attached a horseshoe stirrer or agitator 4 and to the other end of which is attached the driving means 5. The apparatus is also equipped with a line 6 through which the aqueous fermentation residue is fed, a vapor outlet 7, a line 8 equipped with a one-half inch gate valve (not shown) for the removal of the solid particles of residue, a dial thermometer 9, and a line 10 for the introduction of superheated steam or inert gas to the kettle, if the use of such is desired.

Example I

Into the apparatus of Fig. 1 was placed 1.5 liters of granular solids from a previous run and the contents were stirred at 15 R. P. M. and heated to 250° C. by applying heat to the outside of the kettle. Steam at 280° C. was blown through the bed of solids. A molasses fermentation residue containing 16.5% of glycerol, 35.5% of solids and 48.0% of water by weight was fed onto the surface of the bed of solids at the rate of 1730 grams in 1¾ hours. The vapor outlet temperature was 202° C. and the vapors were condensed by means of a water-cooled condenser after they had left the kettle. During the operation the rate of stirring was maintained at 15 R. P. M., the kettle contents at 250° C. and the steam temperature at 280° C.

At the end of the 1¾ hour run, 4730 grams of condensate had been collected, analyzing 5.3% by weight of glycerol, the remainder of the condensate being water and other condensed volatiles. 87.7% of the glycerol contained in the feed was thereby recovered in the distillate.

From time to time granular particles were removed from the kettle through the valve in line 8 to maintain a substantially constant level of the solid particles in the kettle. The granular particles thus produced were darkly colored and 90% of them would not pass through a No. 30 sieve (U. S. Standard Sieve Series). All the particles were hard, brittle and non-hygroscopic.

Example II

The kettle shown in Fig. 1 was filled with 1.5 liters of granular solids from a previous run and the contents were then stirred at 15 R. P. M. and heated to 235° C. by a flame which was applied to the outside of the kettle. Steam heated to 250° C. was blown through the bed of solids. A molasses fermentation residue containing 30.8% of lactic acid, 20.2% of solids and 49% of water by weight was fed to the surface of the stirred residue while the temperature of the contents was maintained at 235° C. and while the stirrer was operated at 15 R. P. M. The vapors, which had a temperature of 165° C., were condensed after they had left the kettle.

Two thousand seven hundred and forty grams of feed was used in 2.5 hours and 2650 grams of distillate was recovered. The distillate analyzed 31.1% by weight of lactic acid giving a calculated lactic acid recovery of 87.9%. From time to time throughout the processing granular particles were removed through the valve at the bottom of the kettle to keep the level of the granules in the pot at the starting level.

The granules were darkly colored and 90% of them would not pass through a No. 30 sieve (U. S. Standard Sieve Series). The granules withdrawn were free-flowing, non-hygroscopic, hard, nodular solids.

Example III

Figure 2:
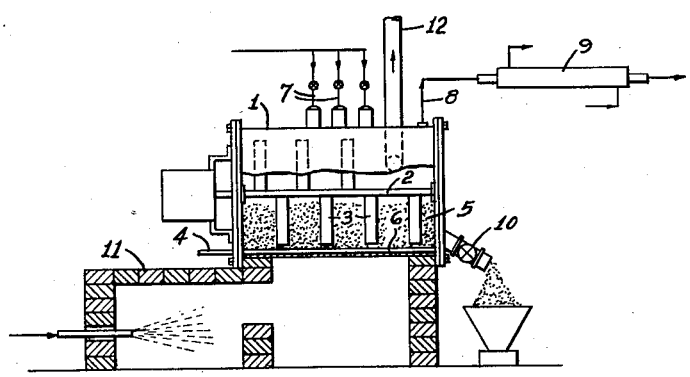

The drying and granulation chamber in this experiment consisted of a horizontal steel tube 1, 12 inches in diameter by 3 feet in length, provided with an axial shaft 2 equipped with radially extending paddle-type agitator blades 3, as shown in Fig. 2. Means 4 were provided for introducing steam into the bed of granules 5 from ⅛ inch openings in a pipe 6 placed along the bottom of the steel shell, and the liquid fermentation residue was introduced through ⅛ inch pipes 7 in the upper portion of the drying chamber. Heat was applied to the lower portions of the horizontal shell and the agitator blades were driven by an externally extending shaft and gears. Vapors were removed by a pipe 8 leading from the top of the shell to a suitable condenser 9 and a valve-equipped pipe 10 led from one end of the shell at a point below the level of the granular solids for the purpose of withdrawing the latter at intervals in order that a substantially constant level of granular solids might be maintained in the shell. The heating of the steel tube was effected by direct contact with hot gases from the oil-fired furnace 11 having a stack 12.

In carrying out the process, the steel shell was first half-filled with granules from a previous run, and the granules were heated to 200–220° C., the agitator being run at about 20 R. P. M. During this initial heating, steam at a temperature of about 110° C. was passed through the granules.

Concentrated aqueous fermentation residue derived from molasses was admitted to the drier in the amount of 112¼ pounds over a three hour period, the bed of granules being maintained at 200–220° C., the agitator still being rotated at 20 R. P. M., and steam at 110° C. still being passed through the bed of granules. The feed contained 11.85% of glycerol by weight. During the run 172.5 pounds of condensate was collected which contained 6.58% glycerol by weight, amounting to a recovery of 35.3% of the glycerol in the feed.

Granular solids were withdrawn during the run, and their size was substantially the same as those originally placed in the drier. The withdrawn solids were free-flowing, non-hygroscopic, nodular, hard particles.

Example IV

In another experiment, using the same apparatus and operating conditions as in Example III, 73 pounds of concentrated aqueous fermentation residue derived from molasses containing 12.26% of glycerol was fed to the drier over a two hour period. 126 pounds of condensate were collected which analyzed 6.94% glycerol, indicating a recovery of 97.7% of the glycerol present in the fermentation residue. The withdrawn solids were comparable in amount and size to those obtained in Example III and were free-flowing, non-hygroscopic, hard, nodular particles.

*Example V*

In another experiment, a conventional drier of rotary type approximately 18" in diameter by 6" in length was used for drying a concentrated aqueous ethyl alcohol fermentation residue derived from molasses. The drum was filled to its operating level with granular residue from previous runs and the concentrated fluid residue fed at the rate of approximately 1 pound per hour. With a temperature in the body of solids of about 150° C., and of 240° C., in the combustion gases utilized for drying, granular, non-hygroscopic, nodular, hard particles were obtained from the discharge port in the end plate of the drier.

Any of a wide variety of materials may be employed in obtaining the residue from a previous run, which was employed in the above examples. Thus, such residue may be prepared using a hard, inert, granular material (e. g., sand, calcium superphosphate, etc.) in place of the residue from a previous run used in the examples and then repeating the procedures of the examples, carrying out the process for a sufficient length of time to result in the removal of all of the starting granular material, such as sand, from the apparatus.

The vapors arising from the heated bed of granular material may be voided to the atmosphere or passed into a suitable condenser for condensation and recovery of materials contained therein such as glycerine, lactic acid, butyric acid or 2,3-butylene glycol. Dust collectors, cyclones and similar apparatus may be used to separate entrained dust from the vapors. In place of the steam previously mentioned, inert gases such as carbon dioxide, nitrogen or combustion gases may be used to facilitate removal of volatile materials. Such gases, as well as the steam, may be superheated before introduction into the drier. Decreased pressure may be used if desired as a further means for increasing the degree of removal of volatile constituents as well as permitting the use of lower temperatures for separation of volatile from non-volatile constituents.

Methyl alcohol may be used to facilitate the removal of lactic acid as the methyl ester. The alcohol or its vapors may be fed into the drier along with the liquid fermentation residue, or the vapors may be introduced at the bottom of the bed of granular solids. Sufficient esterification catalyst should be present to facilitate the reaction between methyl alcohol and lactic acid.

The temperature of the stirred mass of particles may be varied widely, depending upon the conditions existent. If there is little high boiling volatile material present as, for example, in the residue of an ethyl alcohol fermentation, and it is desired merely to obtain a dry, granular, non-hygroscopic residue, a temperature of about 150° C. will be sufficient, although temperatures of 130° C. to 300° C. may be employed. A temperature somewhat above 150° C. will be required to insure the removal of such volatile materials as glycerine, lactic acid and the like, temperatures above about 300° C. not generally being used.

The granular material formed contains substantially all the potash, phosphate and nitrogen values present in the molasses which was fermented. Such material has fertilizer value not only because of the plant foods present, but also because such foods are in a form which gives the material value as an extender and conditioner for commercial fertilizers. If it is desired, other materials of fertilizer value may be added to the concentrated liquid fermentation residue before admission to the drier, or such addition may be separate and simultaneous. Such substances as urea, sodium nitrate, ammonium sulfate, soluble phosphate or potash salts and the like may be added to increase the fertilizer value of the granular residue.

While the mechanism or process whereby new granules are formed is not clearly understood, it has been observed that, when the liquid fermentation residue comes in contact with the surface of the agitated bed of granular material, a number of granules are brought together to form an agglomerate resembling a blackberry. The volatiles are quickly removed and the agglomerate breaks down into granular particles having little or no increase in size over the original granules. In this way new, free-flowing, non-hygroscopic nodular particles are continuously formed.

Liquid fermentation residues as originally obtained are generally dilute aqueous solutions. While such dilute solutions may be used in the process of the invention it is usually more economical to concentrate the residues in multiple-effect evaporators prior to their introduction to the drier. Residues having water contents over the range of 20 to 80% by weight are useful, with the preferred range being 40 to 60%. The size of particles formed in the drier has been found to vary somewhat with the concentration of the feed, smaller particles being formed when dilute feed solutions are used.

I claim:

1. The method for the separation of the volatile from the non-volatile constituents of an aqueous molasses fermentation residue which comprises maintaining a mass of substantially dry, discrete, solid particles consisting of the non-volatile constituents of a molasses fermentation residue at a temperature adapted to effect vaporization of the volatile consituents of said aqueous residue, stirring the mass, and continuously feeding the aqueous molasses fermentation residue to the mass at a rate such that the granular character of the mass of discrete solid particles is not substantially altered, whereby the volatile constituents of the added fermentation residue are vaporized, and separating the volatile constituents from the mass of solid particles.

2. The process of claim 1 in which the temperature of the mass of solid particles is maintained within the range of 150° C. to 250° C.

3. A method as in claim 1, in which the fermentation residue is an ethyl alcohol fermentation residue.

4. A method as in claim 1, in which the fermentation residue is a glycerol fermentation residue.

5. A method as in claim 1, in which the fermentation residue is a lactic acid fermentation residue.

6. A method as in claim 1, in which the vapors are condensed and recovered.

7. The method for the separation of the volatile from the non-volatile constituents of an aqueous molasses fermentation residue which comprises maintaining a mass of substantially dry discrete solid particles consisting of the non-volatile constituents of a molasses fermentation residue at a temperature adapted to effect vaporization of the volatile constituents of said aqueous residue, stirring the mass, continuously feeding the aqueous molasses fermentation residue to the mass at a rate such that the granular character of the mass of discrete solid particles is not substantially altered, and withdrawing a portion of the mass in the form of discrete nodular non-hygroscopic dry solid particles at substantially the rate at which they are formed.

KENNETH H. WARREN.

REFERENCES CITED

The following references are of record in the file of this patent:

UNITED STATES PATENTS

| Number    | Name     | Date          |
|-----------|----------|---------------|
| 1,609,712 | Guignard | Dec. 7, 1926  |
| 2,022,037 | Hanchett | Nov. 26, 1935 |
| 2,148,579 | Reich    | Feb. 28, 1939 |
| 2,416,615 | Datin    | Feb. 25, 1945 |
| 2,434,672 | Pattee   | Jan. 20, 1948 |

OTHER REFERENCES

Industrial and Engineering Chemistry, June 1945, pages 534–538, "Molasses Stillage," by Gustave T. Reich.